(12) United States Patent
Kataoka et al.

(10) Patent No.: US 6,636,200 B2
(45) Date of Patent: *Oct. 21, 2003

(54) SYSTEM SWITCH

(75) Inventors: Ichiro Kataoka, Shizuoka (JP); Masayuki Ogawa, Shizuoka (JP); Yoshihide Takada, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/179,884

(22) Filed: Jun. 26, 2002

(65) Prior Publication Data

US 2002/0196233 A1 Dec. 26, 2002

Related U.S. Application Data

(63) Continuation of application No. 09/015,512, filed on Jan. 29, 1998, now Pat. No. 6,476,794.

(30) Foreign Application Priority Data

Jan. 31, 1997 (JP) .............................................. 9-019373

(51) Int. Cl.[7] ................................................. G09G 5/08
(52) U.S. Cl. ........................ 345/161; 345/172; 200/5 A; 200/6 A
(58) Field of Search ................................ 345/161–179, 345/156–158; 200/6 A, 5 A; 463/38; 70/237

(56) References Cited

U.S. PATENT DOCUMENTS

| | | | | |
|---|---|---|---|---|
| 3,760,320 A | | 9/1973 | Oka et al. .................... 338/128 |
| 4,425,488 A | | 1/1984 | Moskin et al. ............... 200/220 |
| 4,469,330 A | * | 9/1984 | Asher .......................... 463/38 |
| 4,786,768 A | * | 11/1988 | Langewis et al. ........... 200/6 A |
| 5,260,696 A | | 11/1993 | Maynard, Jr. ................ 345/163 |
| 5,406,076 A | * | 4/1995 | Mimura et al. .............. 250/229 |
| 5,468,924 A | * | 11/1995 | Naitou et al. ................ 200/6 A |
| 5,506,605 A | | 4/1996 | Paley ........................... 345/158 |
| 5,566,087 A | | 10/1996 | Voigt et al. .................. 364/505 |
| 5,646,648 A | | 7/1997 | Bertram ....................... 345/168 |
| 5,767,841 A | | 6/1998 | Hartman ....................... 345/167 |
| 5,801,771 A | | 9/1998 | Ohwaki et al. .............. 348/221 |
| 5,825,353 A | | 10/1998 | Will ............................. 345/184 |
| 5,893,798 A | * | 4/1999 | Stambolic et al. ............ 463/46 |
| 5,982,355 A | | 11/1999 | Jaeger et al. ................ 345/161 |
| 5,982,356 A | | 11/1999 | Akiyama ..................... 345/161 |
| 6,241,611 B1 | * | 6/2001 | Takeda et al. ................. 463/38 |
| 6,476,794 B1 | * | 11/2002 | Kataoka et al. ............... 345/61 |

* cited by examiner

*Primary Examiner*—Vijay Shankar
*Assistant Examiner*—Mansour M. Said
(74) *Attorney, Agent, or Firm*—Finnegan, Henderson, Farabow, Garrett & Dunner LLP

(57) ABSTRACT

A system switch comprises an operation switch constituted by a mode switch and low-ranking switches of the mode switch; a display unit; and a control unit. The control unit makes the display unit display the operation switch, interprets the function of the operation switch at that time, and outputs a control signal for executing the function of the operation switch at that time when the operation switch is operated.

5 Claims, 10 Drawing Sheets

HIF : HUMAN INTERFACE

SYSTEM SWITCH

This is a continuation of application Ser. No. 09/015,512 U.S. Pat. No. 6,476,794, filed Jan. 29, 1998 which is incorporated herein by reference.

BACKGROUND OF THE INVENTION

The present invention relates to a switch, and particularly relates to a system switch in which a group of switches with a large number of functions are systematized compactly.

Recently, with the advance of making information, it is a tendency to mount a large number of information apparatus in one system. For example, with respect to a system of a car, a car has been mounted with a large number of apparatuses such as an air conditioner, a navigation system, an audio system, a traffic information system. At present, a display system and an operation system are provided in every apparatus. Therefore, switches are provided correspondingly to respective functions for switching these apparatuses, for controlling and tuning the switched apparatuses, and so on.

Function display is provided for every switch for displaying the function of the switch. FIG. 8 shows a conventional human interface. In an information apparatus A, each of information 1, information 2 and information 3 has a display function and a switch function exclusively for the information apparatus A, and a user operates the information apparatus A in view of these display function and switch function so as to obtain any one of information 1, information 2 and information 3. In the same manner, in an information apparatus B, information 4, information 5 and information 6 are obtained by use of a display function and a switch function provided in each of the information 4, information 5 and information 6 exclusively for the information apparatus B.

However, when various information are used in the future, it becomes more difficult from the viewpoint of not only space but also easiness to use, to allocate a switch to information or information apparatus one by one. In addition, taking option into consideration, it is necessary to change the operation system in accordance with the option, and hence the system lacks generality. Accordingly, there is a fear that the cost increases. In addition, at present, the function of information to be taken up is often displayed on a switch for taking the information up. Accordingly, it may be difficult to operate the switch if the switch is provided in the position where a driver can easily see the display of the switch, while it may be difficult to see the display of the switch if the switch is provided in the position where a driver can easily operate the switch.

Thus, as the number of apparatuses mounted on a car increases, the number of switches increases more than the increasing number of the apparatus. Therefore, there arise various problems such as increase of a space for switches, deterioration of performance in operating switches, difficulty in adding and changing switches, and so on. For example, when four apparatus of an air conditioner system, a navigation system, an audio system, and an information system (VICS; Vehicle Information and Communication System) are mounted on a car, middle- and low-ranking functions for controlling and tuning the apparatus as shown in FIG. 1 are required in each apparatus. Then, according to simple calculation, required are large number of switches, that is, 64 switches in total, including four switches for switching these apparatus (hereinafter, this type of switch will be referred to as "mode switch"), 8 4=32 apparatus tuning switches C as low-ranking switches of the respective apparatus, and further 4 3+16 (corresponding to low-ranking switches of the audio system)=28 apparatus tuning switches "d" as low-ranking switches of a tuning switch "a". In addition, as mentioned above, it is not easy to simultaneously realize two contradictory requests that the switches are provided within a driving field of a driver in order to make it easy for the driver to see the display of the switch and the switches are disposed near a hand of the driver in order to make it easy for the driver to operate the switch.

SUMMARY OF THE INVENTION

It is therefore an object of the present invention to solve such problems.

In order to solve the above-problems, according to the present invention, a system switch comprises: an operation switch constituted by a mode switch and low-ranking switches of the mode switch; a display means; and a control unit; wherein is the control unit makes the display means display the operation switch, interprets the function of the operation switch at that time, and outputs a control signal for executing the function of the operation switch at that time when the operation switch is operated.

Preferably, the operation switch includes a joy stick, and the mode switch is realized by the joy stick.

Preferably, other switches are disposed in a region where fingers can touch the switches when a hand is put on the joy stick. The joy stick is shaped like a flat disc, and designed to be able to rotate around a central axis of the disc and inclined forward/backward and right/left so that the joy stick has a switch mechanism corresponding to the rotation and inclination.

Preferably, a positioning member extends to be close to the joy stick from the rear of the joy stick so as to cover the upper surface of the joy stick partially.

Preferably, the control unit also makes the display means display the function of the operation switch at that time when the operation switch is made to be displayed.

DETAILED DESCRIPTION OF THE INVENTION

Figure 9:
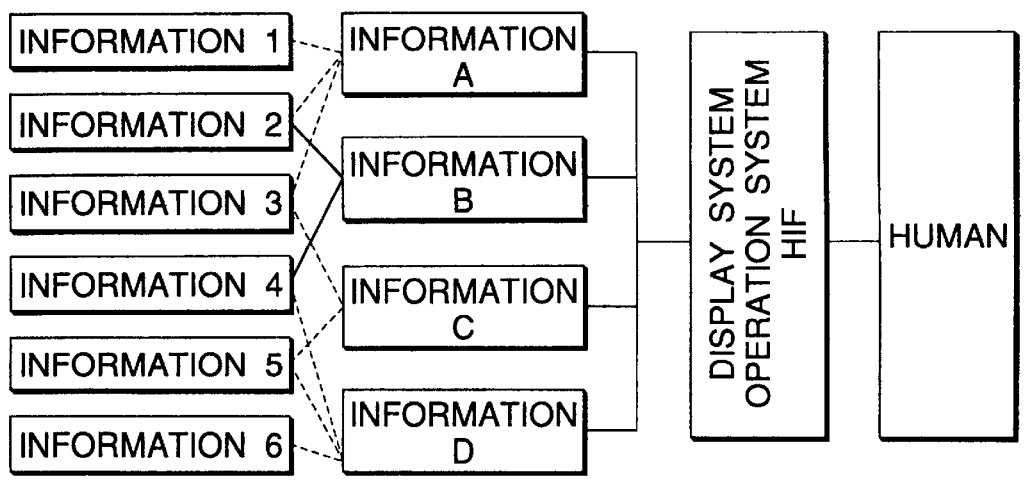
FIG. 9 is a diagram illustrating the configuration of a human interface according to the present invention.

FIG. 9 shows the configuration of a human interface according to the present invention. A human interface constituted by a display system and an operation system which are for general use for extracting information, is used for respective information A, B, C and D without arranging displays and switches individually as in a conventional case so as to be adapted to integrating and composing information. The display system and the operation system of the human interface are separated spatially from each other, so that the display system is disposed in a far and high position in order to reduce the movement of the eyes of a driver in driving, while the operation system is disposed near a hand of the driver. The state of air conditioner, the state of audio (radio, CD, etc.), the navigation (map), the traffic information (for example, vehicle information and communication system (VICS)), and the state of switches are displayed on the display system. The state of switches and the state of information apparatus as the result of the state of switches are displayed simultaneously user-friendly (see FIGS. 10 to 13 which will be described later).

The operation system is constituted by mode switches and apparatus tuning switches (hereinafter referred to as "C-switch"). The former mode switches are switches for changing the latter C-switches into switches for air conditioner, audio, navigation, or traffic information. With such a configuration, the switches can be flexibly adapted to various information apparatuses without changing the number of switches on hardware.

The latter C-switches are switches for changing the state in a certain mode of the above-mentioned modes. For example, in the navigation mode, the C-switches are various switches for displaying a present position of a car, for displaying a wide-area map, and for displaying another route. In the air-conditioner mode, the same switches as described above are changed into switches for turning an air compressor on, for circulating the outside air, and for turning full-automatic control off, respectively. Further, in the audio mode, the same switches as described above are changed into switches for dummy, for turning music CD on, and for turning a radio receiver off, respectively. In the traffic information VICS mode, the same switches as described above are-changed into switches for dummy, for displaying FM multiple graphic information, and for displaying character information of BEACON, respectively.

Because the function of any C-switch is changed in accordance with the mode as mentioned above, it is not possible to write "Switch for Wind Direction of Air Conditioner" on the C-switch itself. Therefore, according to the present invention, the state of each switch corresponding to the mode as mentioned above is always displayed. As a result, even if the function of the C-switch is changed, a driver can easily understand what can be done by the switch. Accordingly, as shown in FIG. 9, information 1 and information 2 can be integrated into information A, and the information A is allocated to the switch. As for the display of the state of the switch, a real picture or a deformed drawing may be displayed. It is easier to understand if the screen of an operated switch in the display system is made to change its color, blink, or show the state where the switch is pushed, when the switch is operated. In the navigation mode, the switch is preferably designed to have a motion like a joy stick which will be described later, because it is necessary to scroll a map. Then, the switch is devised to be able to be gripped in an enlarged state. This is because the performance is improved by moving the switch largely by not a finger but by a hand as a whole when the switch is operated, and it is made easy for a driver to position the switch without falling the eyes thereon when the switch is operated because the switch in the form of a joy stick can be recognized comparatively easily.

The present invention will be described below more specifically.

Figure 2:
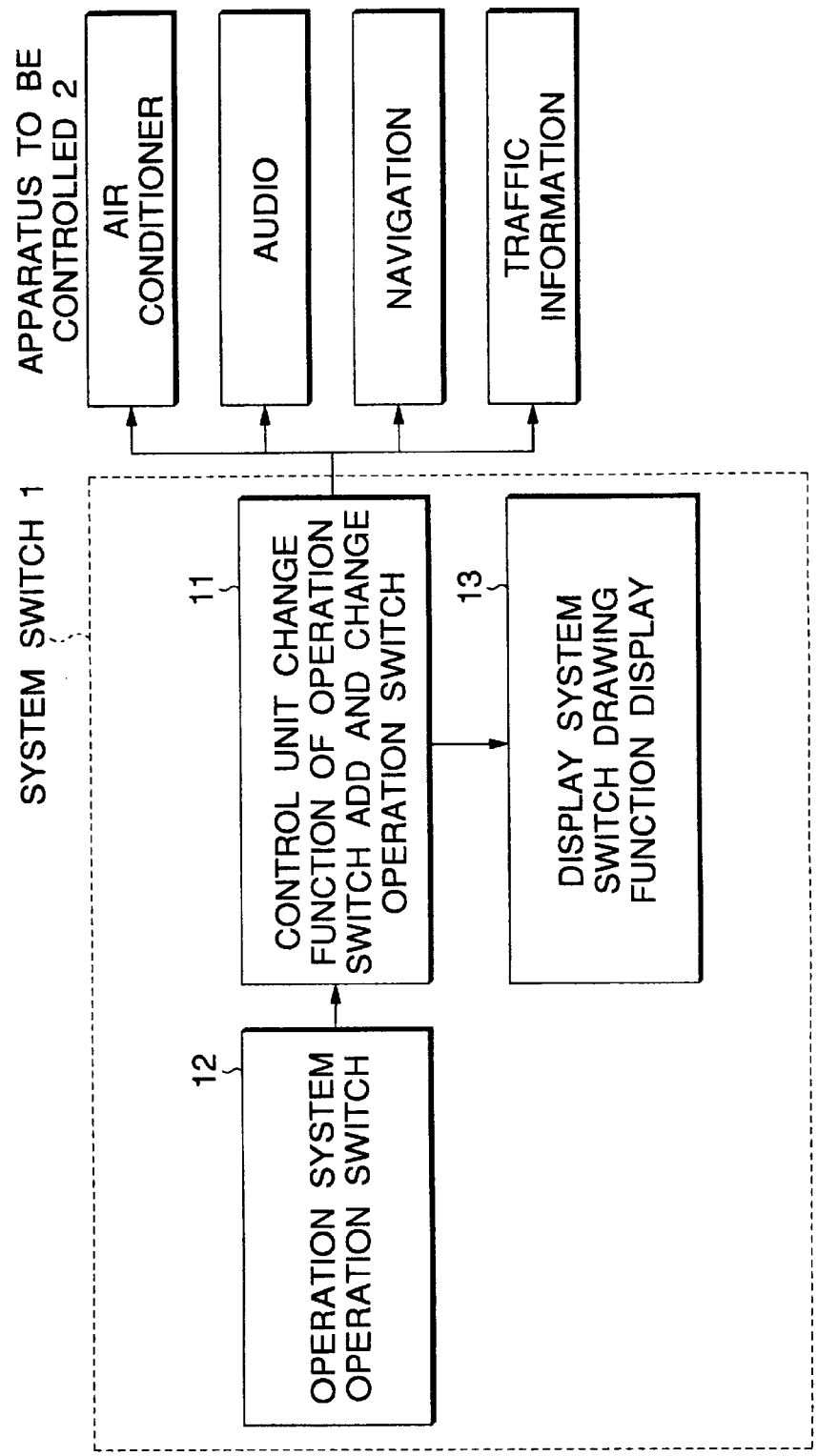
FIG. 2 is a diagram illustrating the configuration of a system switch.

FIG. 2 shows a total configuration of a system switch 1 according to the present invention. The system switch 1 is constituted by a control unit 11, an operation system 12, and a display system 13, and respective control apparatus systems 2 are controlled by the output of this system switch 1.

The control unit 11 has a function for changing the functions of an operation switch, for adding another operation switch and changing the operation switch, and a function for displaying an associated operation switch and its functions. The control unit 11 is constituted by a microprocessor, a RAM, an AD converter and an encoder for signals from the operation system 12, and a decoder and a driver for the display system 13, and so on.

The operation system 12 includes a real operation switch which can be operated by a driver directly, and it is disposed near a hand of the driver in order to facilitate to operate the operation system 12. In the present invention, the operation system 12 is realized by a joy stick shown in FIG. 3 which will be described later.

The display system 13 includes a display 131 for displaying the shape of an operation switch 121 and respective functions of various switches constituting the operation switch 121. The driver operates the operation switch 121 disposed near the driver's hand in view of the switch and its functions displayed on the display 131.

The respective control apparatus systems 2 are apparatuses to be controlled, such as an air conditioner, an audio system, a navigation system, a traffic information system (vehicle information and communication system), etc.

[Operation System 1]

Figure 3:
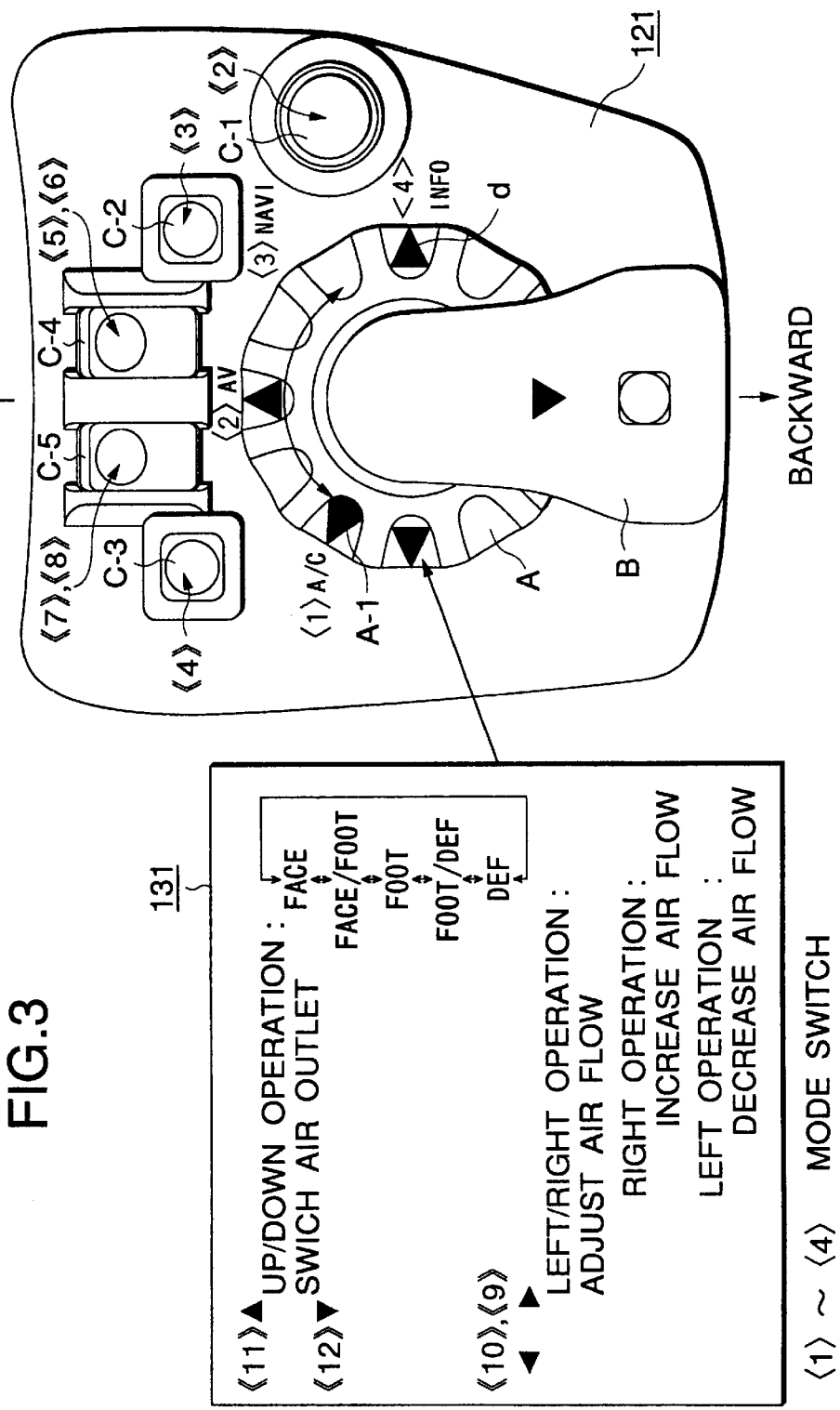
FIG. 3 is a view illustrating the structure of an operation switch and its functions.
Figure 4:
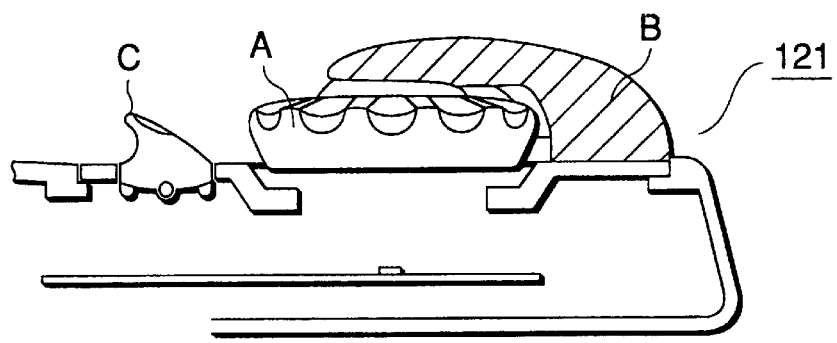
FIG. 4 is a side view of the operation switch.

FIG. 3 is a plan view of the operation switch 121, and FIG. 4 is a side view thereof. The operation switch 121 is constituted by a disc-like joy stick A provided at its center, a positioning member B for positioning a hand put thereon, and respective C-switches C-1 to C-5 disposed in front of the joy stick A and correspondingly to five fingers when a hand is put on the positioning member B.

The joy stick A itself can rotate around its central axis. A needle A-1 is set at an A/C (air conditioner) mode, an AV (audio/visual) mode, a NAVI (navigation) mode, or an INFO (VICS, traffic information) mode inscribed on a switch board, and stopped at each mode for more than a predetermined time (for example, 0.5 seconds), so that it is possible to select the respective modes of a high-ranking function <1> of air conditioner (A/C), a high-ranking function <2> of audio (AV), a high-ranking function <3> of navigation (NAV), and a high-ranking function <4> of information (INFO), shown in FIG. 1.

Alternatively, the joy stick A may be designed so that it is always returned to a neutral position by a spring after selecting the mode. That is, the joy stick A may be designed such that when the joy stick A itself is rotated slightly right or left around its central axis, the rotation for selecting the mode is started, so that candidates are displayed on the display 131 sequentially at a predetermined interval in the order of A/C mode→AV mode→NAVI mode→INFO mode→A/C mode→AV mode . . . ; when the hand gripping the joy stick A is released therefrom, the joy stick A returns to the neutral position, and the mode displayed on the display 131 at that time is selected. Moreover, the joy stick may be designed such that when the joy stick A is reversely rotated slightly right or left around its central axis, the rotation for selecting the mode may be reversely started.

Figure 5:
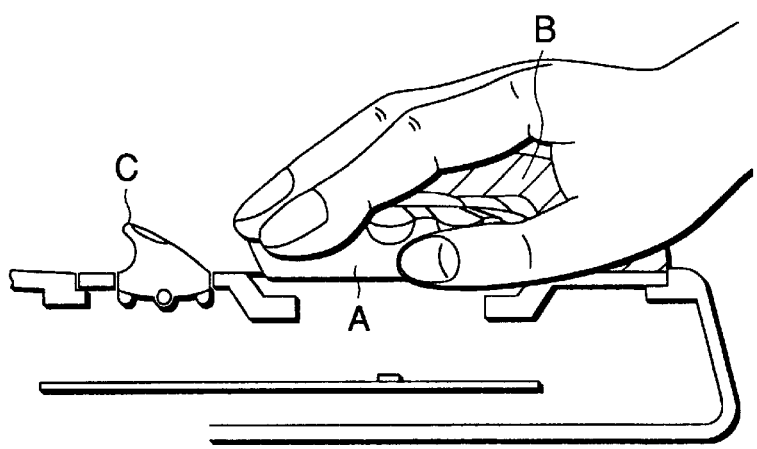
FIG. 5 is a view showing a state in which a joy stick of the operation switch is operated.
Figure 6:
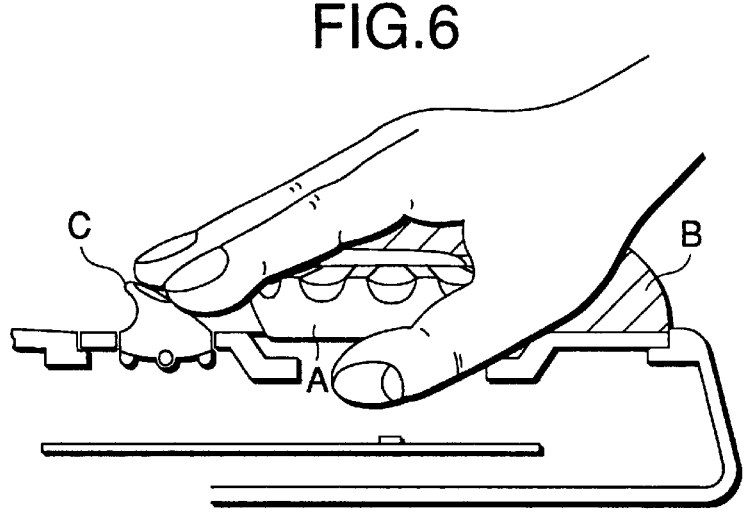
FIG. 6 is a view showing a state in which an apparatus tuning C-switch of the operation switch is operated.

The positioning member B provided according to the present invention, extends from the rear of the operation switch 121 and near the joy stick A so as to cover the upper surface of the joy stick A. In use, a hand is put on the positioning member B. When the joy stick A is rotated, fingers are put on the front and side surfaces of the joy stick A so as to rotate the joy stick A as shown in FIG. 5. When a C-switch is operated, it will go well only if a finger on a desired C-switch is pushed down because the finger can touch the C-switch naturally when the finger is extended, as shown in FIG. 6. In such a manner, because any operation can be performed while fixing the hand onto the positioning member B when the operation switch 121 is operated, it is always possible to have an access to any C-switch stably. In addition, there is no fear that a driver touches another switch carelessly. Further, there is no fear that long-term operation makes the shoulder of a driver stiff, or the like.

The C-switches are constituted by a push/rotation switch C-1, and respective push/pull switches C-2 to C-5. In the case of FIG. 3 in which the A/C (air conditioner) mode is selected, the respective switches C1 to C5 have specific functions as follows. The C-switch C-1 can switch on/off the power supply of the air conditioner alternately by pushing the C-switch C-1. In addition, this C-switch C-1 can also rotate. The right rotation of the C-switch C-1 results in increase in the set temperature of the air conditioner, while the left rotation results in decrease of the set temperature of the air conditioner. The C-switch C-2 displays a menu screen by pushing the C-switch C-2, and dummy (no output) by pulling. The C-switch C-3 turns the air compressor on by pushing the C-switch C-3, and turns the air compressor off by pulling. The C-switch C-4 circulates the outside air in the air conditioner by pushing the C-switch C-4, and circulates the inside air (circulates the air indoor) in the air conditioner by pulling. The C-switch C-5 turns full automatic running of the air conditioner on by pushing the C-switch C-5, and turns the full automatic running of the air conditioner off, that is, turns manual running on by pulling.

Figure 1:
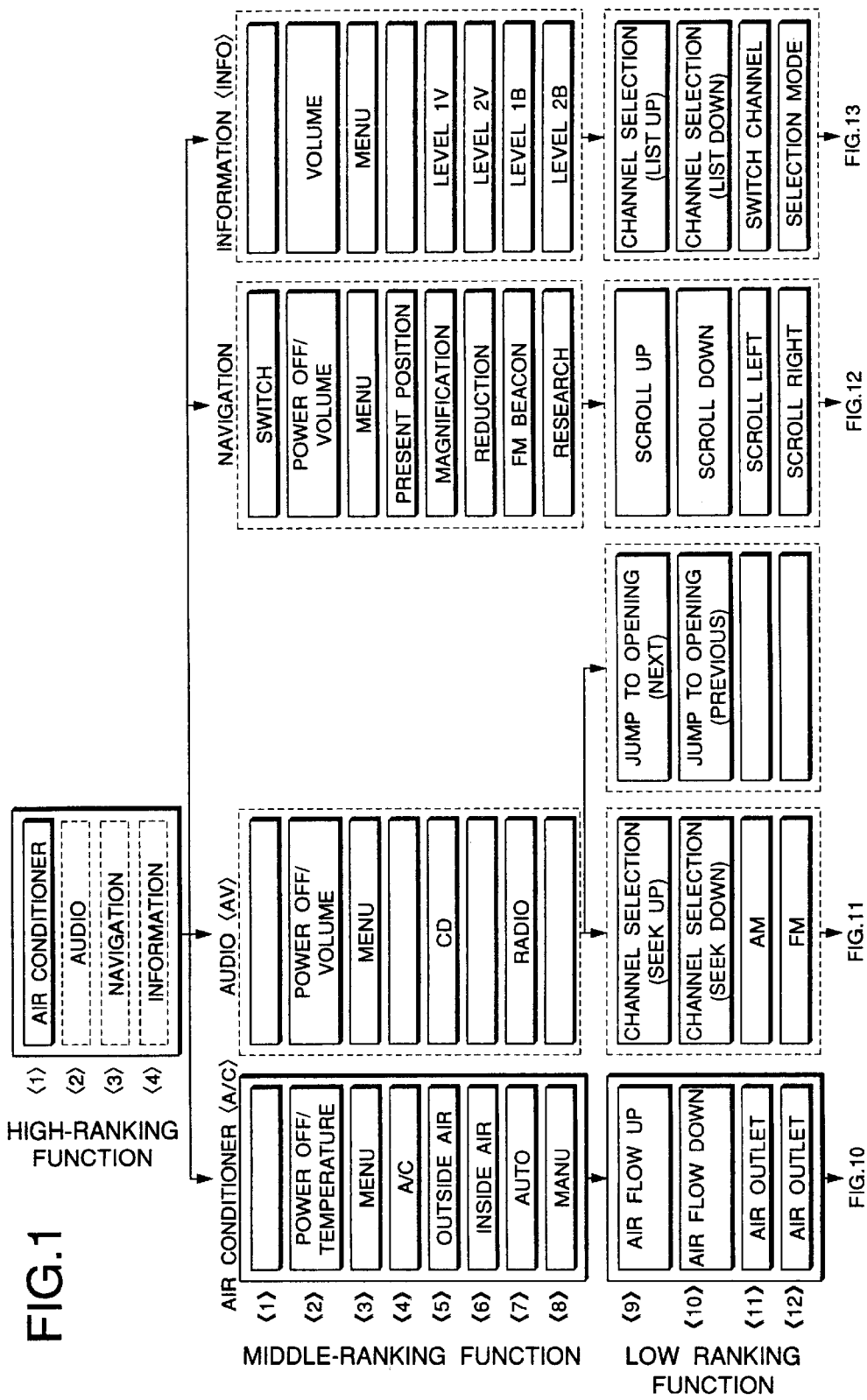
FIG. 1 is a diagram showing the correspondence between the hierarchy of functions of apparatus switches and an operation system or a display system.

The above operations of the C-switches correspond to a middle-ranking function <<2>> of power supply OFF/temperature, a middle-ranking function <<3>> of menu, a middle-ranking function <<4>> of A/C, a middle-ranking function <<5>> of outside air, a middle-ranking function <<6>> of inside air, a middle-ranking function <<7>> of AUTO, and a middle-ranking function <<8>> of MANU shown in FIG. 1.

In the case of selecting either mode of, AV, NAVI and INFO except A/C by the mode switch of the joy stick A, middle-ranking functions developed in accordance with the selected mode of the audio, navigation and information shown in FIG. 1 are selected by the operation of the C-switches.

That is, when the high-ranking function <2> of audio (AV) shown in FIG. 1 is selected, any one of middle-ranking functions <<2>> of power supply OFF/volume, <<3>> of menu, <<5>> of CD, and <<7>> of radio shown in FIG. 1 is selected by the operation of the C-switches. When the high-ranking function <3> of navigation (NAVI) is selected, any one of middle-ranking functions <<1>> of switch, <<2>> of power supply OFF/volume, <<3>> of menu, <<4>> of present position, <<5>> of magnification, <<6>> of reduction, <<7>> of FM beacon, and <<8>> of research shown in FIG. 1 is selected by the operation of the C-switches. In the same manner, when the high-ranking function <4> of information (INFO) is selected, any one of middle-ranking functions <<2>> of volume, <<3>> of menu, <<5>> of level 1V, <<6>> of level 2V, <<7>> of level 1B, and <<8>> of level 2B is selected by the operation of the C-switches.

In such a manner, the C-switches of C-1 to C-5 have a function as a switch for selecting one of middle-ranking functions developed in accordance with a selected mode. The way to make the middle-ranking functions of the selected mode correspond to the C-switches can be set and changed on software by an operation switch function changing means of the control unit 2.

Table 1 shows an example of the thus set correspondence between push and pull operations of C-switches and the functions selected by those operations, in the case of the air conditioner mode and the navigation mode shown in FIG. 1.

TABLE 1

Correspondence between operations of apparatus tuning switches C and functions of selection

| apparatus tuning switch C | | function | |
|---|---|---|---|
| switch name | operation | air conditioner | navigation |
| C-1 | push | <<2>> ON/OFF power supply | <<2>> ON/OFF map display |
| C-1 | pull | — | — |
| C-1 | right rotate | <<2>> increase set temperature | <<2>> increase volume |
| C-1 | left rotate | <<2>> decrease set temperature | <<2>> decrease volume |
| C-2 | push | <<3>> menu | <<3>> menu |
| C-2 | pull | — | — |
| C-3 | push | <<4>> ON/OFF air compressor | <<4>> display present position |
| C-3 | pull | — | — |
| C-4 | push | <<5>> circulate outside air | <<5>> magnification |
| C-4 | pull | <<6>> circulate inside air | <<6>> reduction |
| C-5 | push | <<7>> automatic | <<7>> FM beacon |
| C-5 | pull | <<8>> manual | <<8>> research |

In addition, the joy stick A has an apparatus tuning switch "d" other than the mode switch. The apparatus tuning switch "d" selects low-ranking functions <<9>> to <<12>> shown in FIG. 1 when the joy stick A is inclined forward/backward and right/left and then kept for more than a predetermined time (for example, 0.5 seconds) in the state where a mode is set.

In the case of FIG. 3 in which the A/C (air conditioner) mode is selected, the apparatus tuning switch "d" is operated as follows.

Inclining the joy stick A to the right results in increasing the air flow (corresponding to the low-ranking function <<9>> of UP of the air flow in FIG. 1), while inclining the joy stick A to the left results in decreasing the air flow (corresponding to the low-ranking function <<10>> of DOWN of the air flow in FIG. 1). Inclining the joy stick A forward results in change of the direction of the air outlet sequentially in the order of direction to only face (FACE) direction to both face and foot (FACE/FOOT)→direction to only foot (FOOT)→direction to both foot and front glass for defrosting (FOOT/DEF)→direction to only front glass (DEF) direction to only face (FACE)→direction to both face and foot (FACE/FOOT)→and so forth in the same manner as described above (corresponding to the low-ranking function <<11>> of switching the air outlet in FIG. 1), while inclining the joy stick A backward (that is, pulling the front portion of the joy stick A) results in change of the direction of the air outlet sequentially in the opposite order to that in the case of inclining the joy stick A forward (corresponding to the low-ranking function <<12>> of switching the air outlet in FIG. 1).

When any mode of AV, NAVI and INFO except A/C is selected by the mode switch of the joy stick A, the low-ranking functions developed in accordance with the selected mode of navigation, audio or information (VICS) shown in FIG. 1 are selected by the operation of the apparatus tuning switch "d", (that is, right inclination, left inclination, forward inclination, and backward inclination of the joy stick A).

That is, when the middle-ranking function <<7>> of radio is selected in the case where the high-ranking function <2> of audio (AV) shown in FIG. 1 is selected, any one of the low-ranking function <<9>> of channel selection (seek UP), <<10>> of channel selection (seek DOWN), <<11>> of AM, <<12>> of FM can be selected. When the middle function <<5>> of CD is selected, either one of the low-ranking function <<9>> of jumping to opening (next piece of music), and <<10>> of jumping to opening (previous piece of music) can be selected.

The way to make the low-ranking functions of the selected mode correspond to the apparatus tuning switches "d" can be set and changed on software by the operation switch function changing means of the interface 2.

Table 2 shows an example of the thus set correspondence between the operations of the apparatus tuning switches "d" (operations of the joy stick A) and the functions selected by the operation, particularly in the case of the air conditioner mode and the navigation mode shown in FIG. 1.

TABLE 2

Correspondence between operations of apparatus tuning switches "d" and functions of selection

| tuning switch "d" | air conditioner | navigation |
| --- | --- | --- |
| incline the joy stick A right | <<9>> UP air flow | <<12>> scroll right |
| incline the joy stick A left | <<10>> DOWN air flow | <<11>> scroll left |
| incline the joy stick A forward | <<11>> switch air outlet | <<9>> scroll up |
| incline the joy stick A backward | <<12>> switch air outlet | <<10>> scroll down |
| incline the joy stick A forward right | — | scroll upper right |
| incline the joy stick A forward left | — | scroll upper left |
| incline the joy stick A backward right | — | scroll lower right |
| incline the joy stick A to backward left | — | scroll lower left |

[Control Unit 11 ]

The control unit 11 has not only the above-described function for setting or changing, on software, the correspondence between the C switches of the apparatus tuning switches and the middle-ranking functions and the correspondence between the operation of the apparatus tuning switches "d" and the low-ranking functions but also an operation switch function changing means for changing, on software, the functions of the mode switches. In addition, the control unit 11 has an-enough capacity to increase the switch functions. The control unit 11 controls the apparatus 2 to be controlled in accordance with the operation of the operation switch of the operation system 12. Further, the control unit 11 has a function to control the display system 13 which will be described later, and display the operation switch on the display 131. When a plurality of the apparatus tuning switches C-1 to C-5 are operated at the same time, the control unit 11 does not give an instruction to the apparatus 2 to be controlled.

When a plurality of the apparatus tuning switches "d" are operated at the same time, the control unit 11 outputs a selected instruction. For example, when upper inclination and right inclination of the joy stick A are made at the same time in the navigation mode, the control unit 11 outputs an instruction to scroll the map on the display 131 upper right.

[Display System 13 ]

Figure 10:
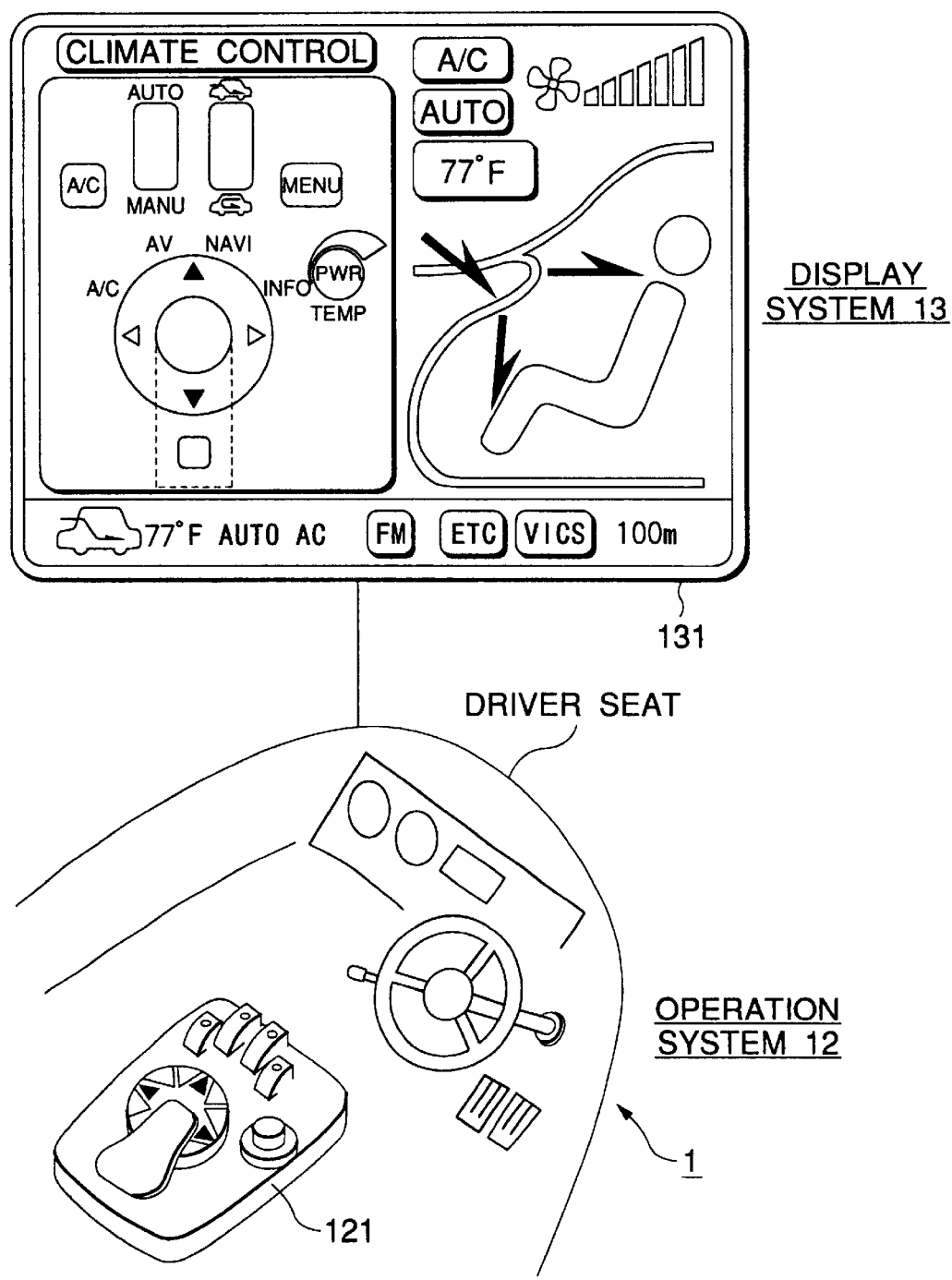
FIG. 10 is a view showing the relationship between the display system and the operation system in the air conditioner mode.

A schematic shape of the real operation switch 121 as the operation system 1 is displayed on the left half of the display 131 as the display system 13 as shown in FIG. 10.

The operation switch displayed on the display 131 changes in accordance with a selected mode.

Figure 7:
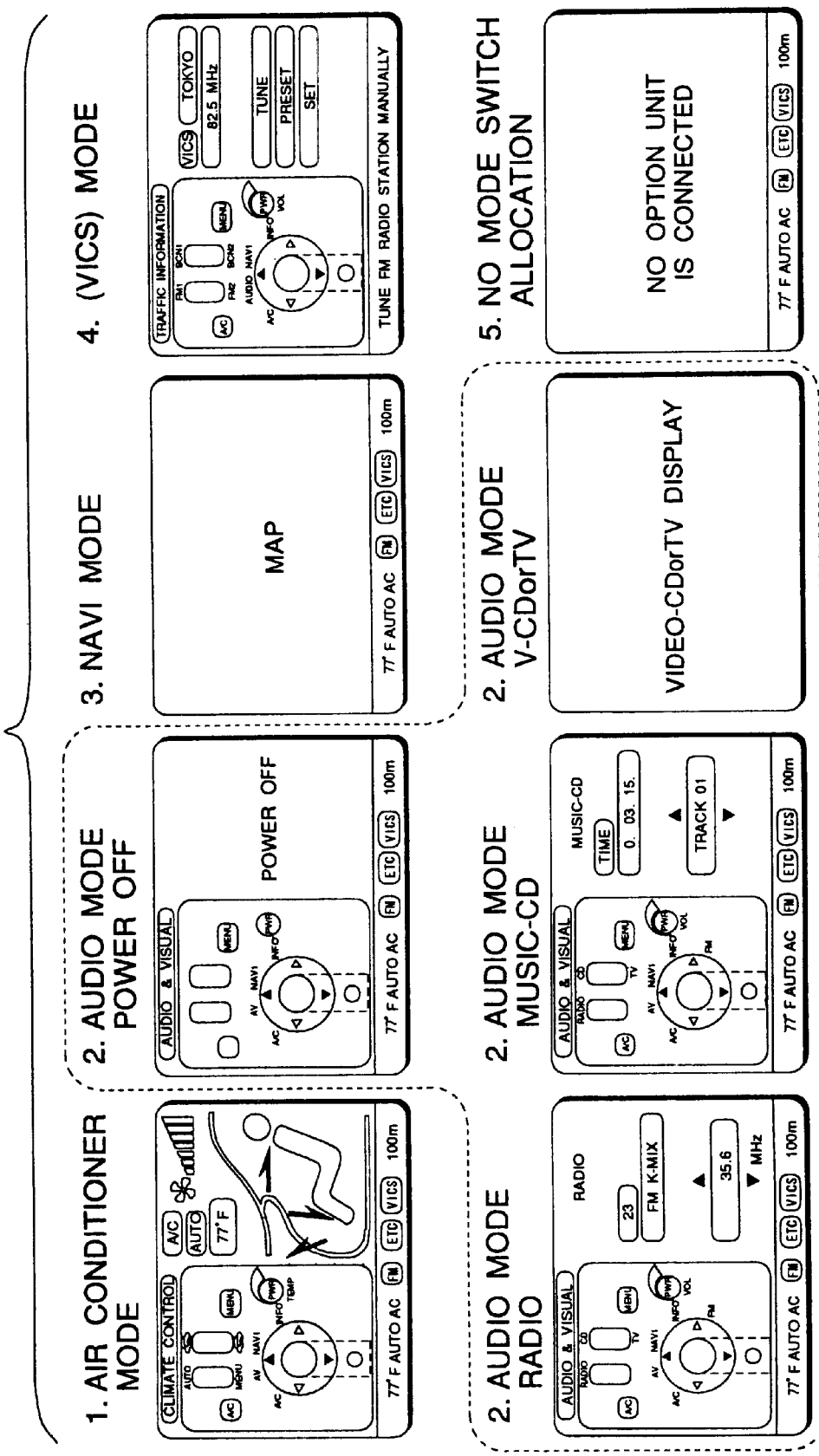
FIG. 7 is a view showing a state of display on a display system.
Figure 8:
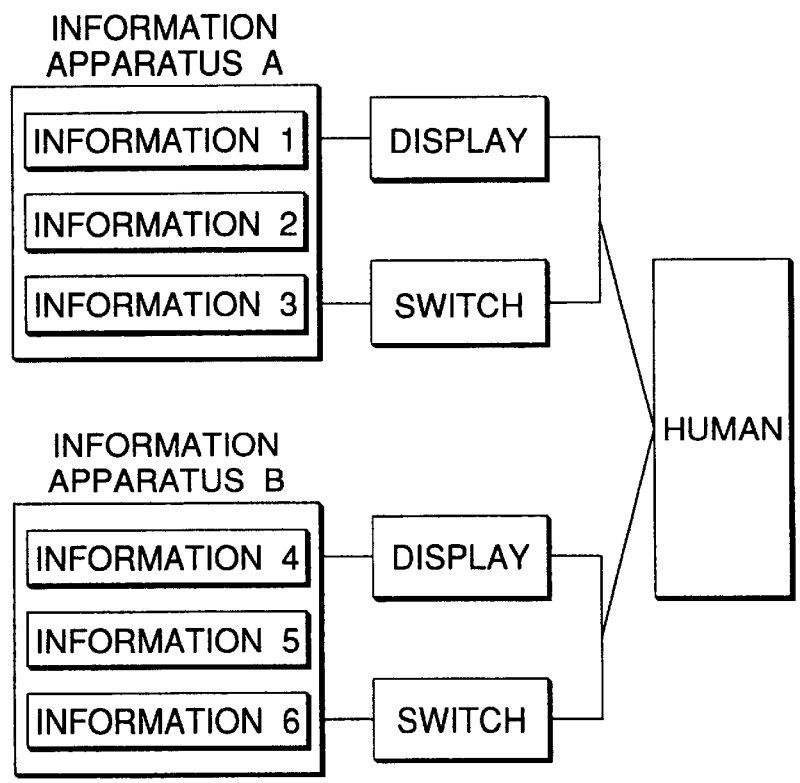
FIG. 8 is a diagram illustrating the configuration of a human interface according to a conventional example.

FIG. 7 shows the screen displayed in every mode in detail. In the audio mode which has a large number of functions to be selected, four indications are displayed in accordance with the selected function. When the mode switch is not set in any position of A/C, AV, NAVI and INFO, the fifth indication "No option unit is connected." is displayed. This fifth mode is used when another option unit is added.

The state of display will be described about the air-conditioner mode screen 1 by way of example.

Characters expressing the functions of the operation switch 121 as well as the schematic shape thereof are displayed on the left half of the screen. For example, the characters of A/C are displayed in the position corresponding to the C-switch C-3 of the operation switch 121, while the characters of AUTO and MANU are displayed in the position corresponding to the C-switch C-5 of the operation switch 121. Seeing these characters, a driver can know that the air compressor is ON if the C-switch C-3 of the operation switch 121 disposed near the driver's hand is pushed, and that the air compressor is brought into full automatic running if the C-switch C-5 is pushed, while the air compressor is brought into manual running if the switch C-5 is pulled.

In such a manner, the driver can operate the operation switch 121 by seeing the operation switch displayed on the display 131 at a position easy to see, and without directly seeing the operation switch 121 which is a real switch disposed near the driver's hand. By the operation of the operation switch 121, the virtual switch corresponding to the operated switch changes its color, blinks, or is changed into a picture in which the switch is operated. An icon A/C of air compressor ON, an icon AUTO of full automatic running, and a flow of air as well as 77° F. indicating the set temperature are displayed on the right half of the screen. FM, ETC, and VICS other than 77° F., AUTO and AC are displayed on the lower portion of the screen.

FIGS. 10 to 13 show the relationship between the display 131 and the operation switch 121 disposed near driver's hand in a driver seat. In the display 131, the layout of the operation switch when one state of a certain mode is displayed and the functions of the operation switch in the mode concerned are displayed on its left side when the state a certain mode is displayed, while present state of the mode concerned is displayed on its right side. In the drawings, any switch function is not shown on the near-hand operation switch 121 side, while the switch functions in the state at that time are displayed above or near the operation switch on the display 131.

FIG. 10 shows an example of display in the air conditioner mode.

The state (upper right) in the air conditioner (A/C) mode and the operation switch (upper left) at that time are displayed on the display 131. A real operation switch 121 corresponding to this operation switch on the display system 13 is shown in the operation system 12 in the lower portion of FIG. 10.

The state display (upper right) is powered on to begin displaying on the display upon pushing of the C-switch C-1 which is a power switch, while powered off upon pushing of the switch C-1 again. Here is expressed that the A/C (air conditioner) is in the state of AUTO (automatic running), the set temperature is 77° F., the air of the air conditioner is sent out in the direction toward the face and foot, and the icon of the air flow is set as the illustrated bar graph.

The illustration of the operation switch 121 (upper left) herein indicates that the mode will be switched in the order of A/C mode→AV mode→NAVI mode→INFO mode by the right rotation of the joy stick A. The air flow can be adjusted by operating the joy stick in the left/right direction, while the direction of the air outlet can be changed sequentially by operating the joy stick in the up/down direction.

In addition, the respective C-switches are also displayed. The air compressor will be turned on if the switch C-3 of the operation switch 121 is pushed, and turned off if pushed again. The air conditioner will be brought into full automatic running if the switch C-5 is pushed, and brought into manual running if pulled. Pushing the switch C-4 results in introducing the outside air, while pulling results in circulating the inside air. In addition, pushing the switch C-2 results in display a menu.

It is displayed that the power of the air conditioner can be switched on and off alternately by pushing the C-switch C-1, and the set temperature of the air conditioner can be increased by right rotation of this C-switch C-1, while the set temperature can be decreased by the left rotation of the C-switch C-1. The C-switch C-1 may be pushed if it is desired to turn the air flow off.

It is displayed in the lowermost end portion of the display 131 that the outside air is being introduced (oppositely to the circulation of the inside air) at present, the set temperature is 77° F. (variable by 1° F. within the region of from 64° F. to 90° F.), and the air conditioner is in the full automatic mode (oppositely to the manual mode). In addition, other modes are also displayed. That is, it is understood that a radio tuner (FM) is now on (the rest modes are CD insertion, AM and TV), an ETC unit is powered on, VICS is being received, and the scale of navigation is 100 m.

Figure 11:
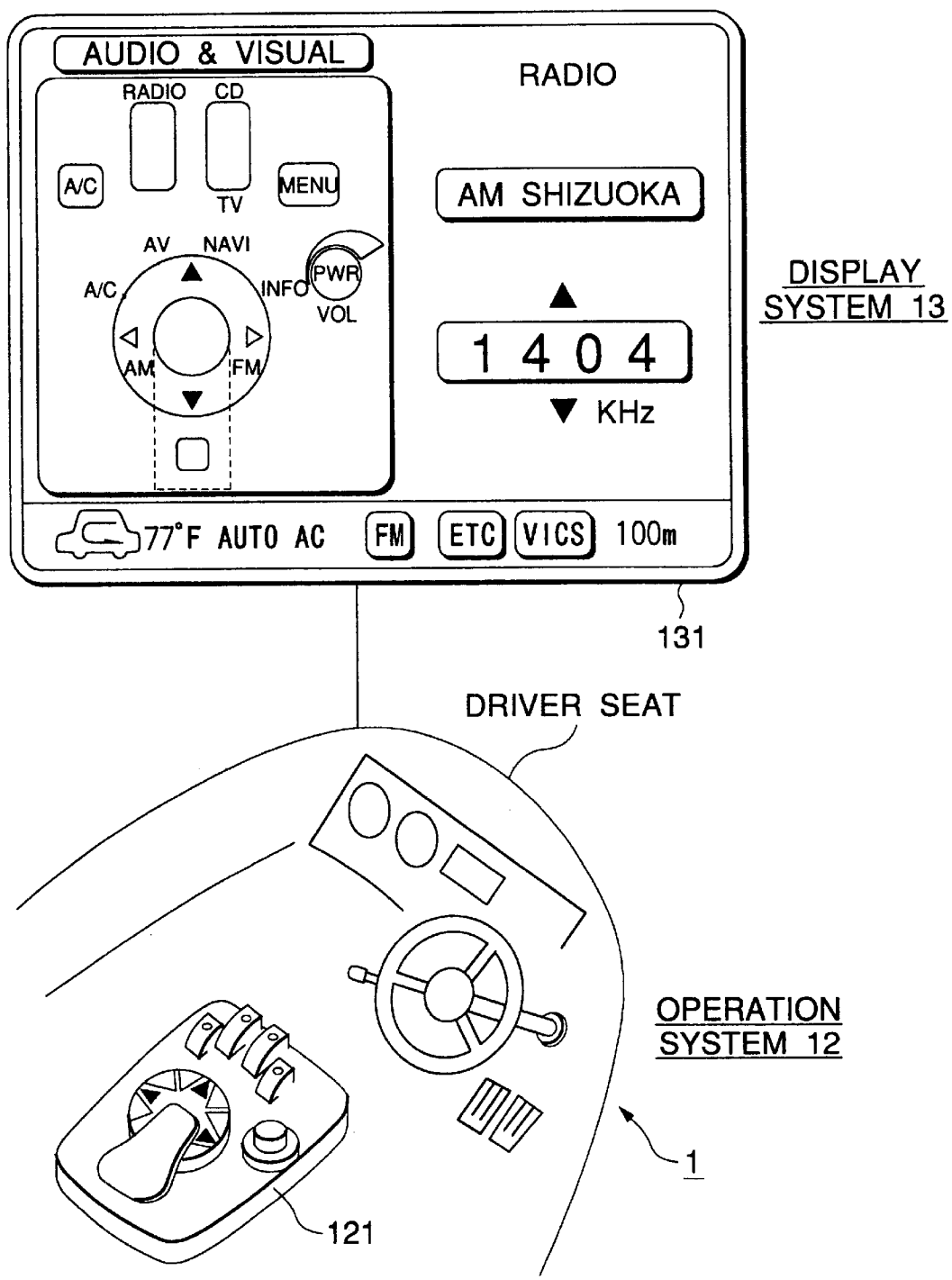
FIG. 11 is a view showing the relationship between the display system and the operation system in the audio mode.

FIG. 11 shows an example of display in the audio mode. In the audio mode, the radio screen (AM or FM), the music CD screen, the video CD screen and the TV screen can be displayed. Here, the radio screen indicates that the broadcasting of AM-SHIZUOKA (1,404 KHz) of radio broadcasting (RADIO) is being received. The arrows above and under the display of 1,404 KHz indicate that the frequency can be changed to higher side by 1 step (0.1 MHz) if the joy stick is pushed forward, while the frequency can be changed to lower side by 1 step (0.1 MHz) if the joy stick is pushed backward. Radio selection can be made by pushing the C-switch C-5, and AM or FM can be selected by pushing the joy stick down to the left or the right. CD or TV are selected by pushing or pulling the C-switch C-4, respectively. As for the selection of a track of CD, the track is increased or decreased to the upper or lower side one by one if the joy stick is pushed forward or backward in the same manner as in the case of radio. If it is desired to make the audio display off, the power switch C-1 may be pushed. Channel selection in the TV screen can be made by inclining the joy stick forward or backward in the same manner as described above. When a stereo broadcasting is received, "ST" is displayed. When no CD is inserted, "NO DISC" is displayed. When a CD is played, for example, "0H03M15S" (0 hour, 3 minutes and 15 seconds) is displayed every moment.

In each AV screen, a menu is displayed when the MENU switch (C-2) is pushed, and then a cursor is on an item of AV. Similarly, also in another mode, a menu is displayed when the MENU switch (C-2) is pushed, and then the cursor is on an item of the mode. The cursor can be moved up/down and right/left by inclining the joy stick forward/backward and right/left.

Figure 12:
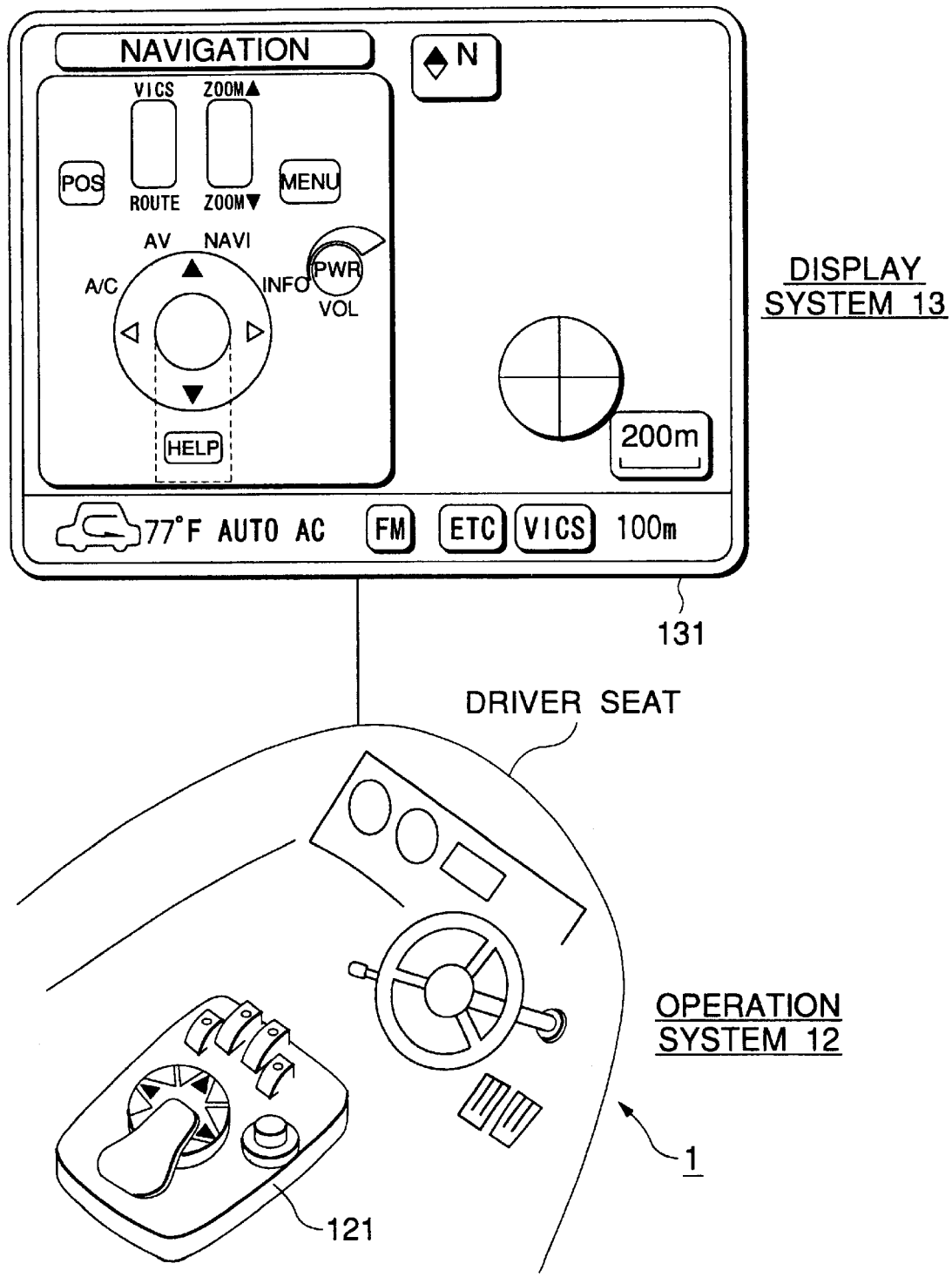
FIG. 12 is a view showing the relationship between the display system and the operation system in the navigation mode.

FIG. 12 shows an example of display in the navigation (NAVI) mode. In the navigation mode, the screen is switched between a map display and a switch display whenever a HELP switch is pushed, and the screen returns to the map displaying screen automatically if there is no operation for 20 seconds from the time when the screen has been switched to the switch displaying screen. In the same manner as in the other modes, the map display is turned on and off repeatedly whenever the power switch is pushed. In addition, the map displayed on the screen can be moved up/down, right/left, and in oblique directions by the operation of the joy stick as mentioned in Table 2. When a POS switch (C-3) is pushed, the present place is displayed. The mark in which + enclosed by a circle indicates an icon which is scrolling. When a ZOOM switch (C-4) is pushed or pulled, a scale bar (for example, a stack of many trapezoidal icons the width of which is gradually reduced from the lower side toward the upper side in the screen) is displayed on the map. The cursor on the scale bar is moved up by pushing the ZOOM switch, and the screen is switched to the map display with the selected scale after one second from the time when the cursor is stopped so as to widen (reduce) the map. Similarly, the cursor on the scale bar is moved down by pulling the ZOOM switch, and the screen is switched to the map display with selected scale after one second from the time when the cursor is stopped so as to make the map detailed (magnified). When the ROUTE switch (C-5) is pulled, another route is displayed on the map in the case where the destination is set in advance. Whenever the VICS switch (C-5) is pushed, the display on the VICS level 3 is switched on or off. With the display on the VICS level 3, a VICS icon is displayed, and the time when the displayed information is provided is displayed under the VICS icon. When the MENU switch (C-2) is pushed, a menu is displayed, and then the cursor is on an item of NAVI.

Figure 13:
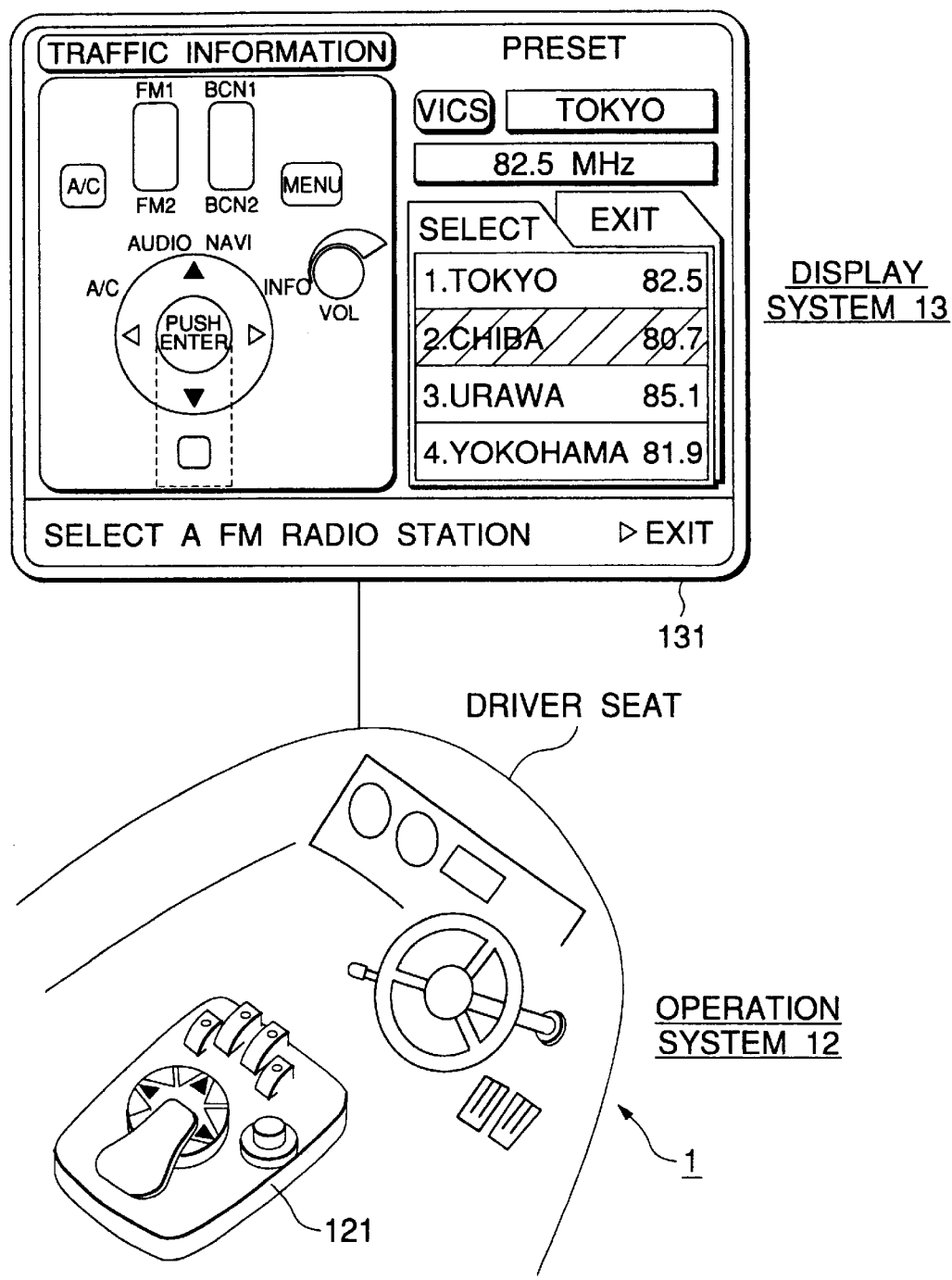
FIG. 13 is a view showing the relationship between the display system and the operation system in the traffic information mode.

FIG. 13 shows an example of the display in the traffic information (VICS) mode.

FM1 (=display of VICS FM multiple character information) and FM2 (=display of VICS FM multiple graphic information) are selected in response to pushing and pulling the switch C-5 respectively. BCN1 (=display of BEACON character information) and BCN2 (=display of BEACON graphic information) are selected in response to pushing and pulling the switch C-4 respectively. After selecting the information, channel selection or the like, and cursor movement are performed by operating the joy stick up/down and right/left. When the MENU switch C-2 is pushed, a menu is displayed on the screen, and then the cursor is on an item of TRAFFIC. A selected item is executed by pushing an ENTER key. For example, after "TUNE", "PRESET" or "SET" is selected by the joy stick, the selected item is executed by pushing the ENTER key. When "PRESET" is selected by the joy stick, pushing the ENTER key results in displaying a plurality of broadcastings to be preset (1 designates a Tokyo station at 82.5; 2, a Chiba station at 80.7; 3, a Urawa station at 85.1; 4, a Yokohama station at 81.9; ... ). The cursor is moved by the joy stick, and the ENTER key is pushed to thereby determine a broadcasting. In FIG. 13, "PRESET" is being selected, that is, the Tokyo station having the frequency of 82.5 MHz is received at present in the VICS mode, while the cursor is on the Chiba station (80.7 MHz) at present. By inclining the joy stick right, the cursor can be moved to EXIT.

Although the description has been made about the case where four modes, that is, the A/C (air conditioner) mode, the AV (audio/visual) mode, the NAVI (navigation) mode and the INFO (VICS, traffic information) mode can be selected by the joy stick by way of example, it is matter of course that the present invention is not limited to the case of these four modes. Of course, it is possible to take necessary modes into the joy stick sequentially.

As has been described above, according to the present invention, the functions of a group of low-ranking switches can be changed corresponding to the setting of a high-ranking switch. Accordingly, it is possible to reduce the number of switches on a large scale, and to reduce the space for the switches.

In addition, a control unit is made to have a function to add and change an operation switch corresponding to the addition and change of an apparatus switch. Accordingly, it is easy to add and change an option apparatus, and it is possible to improve the generality of the switch. Further, a display means for displaying a virtual operation switch is provided individually of a real operation switch. Accordingly, it is possible to obtain a switch which is easy to see and easy to operate.

Moreover, a joy stick is shaped like a flat disc, and designed so as to be rotated around the central axis of the disc and to be inclined forward/backward and right/left to form a switch mechanism corresponding to the rotation and inclination of the joy stick. Accordingly, it is easy to operate the joy stick. In addition, the joy stick is further provided with a positioning member for fixing a hand put thereon. Accordingly, it is always possible to make an access to switches stably, and there is no fear that a driver touches another switch carelessly. Further, there is no fear that long-term operation makes the shoulder of a driver stiff, or the like.

What is claimed is:

1. A system switch device, comprising:

a flat panel;

a disk-shaped first switch member movably provided on the flat panel; and a knob member provided on the first switch member, on which a user's hand is placed, wherein the first switch member moves on the flat panel in a direction identical with a direction in which the knob member is operated.

2. A system switch device as set forth in claim 1, wherein the first switch member is horizontally rotatable on the flat panel, in association with the motion of the knob member.

3. The system switch device as set forth in claim 1, wherein the first switch member is horizontally rotatable on the flat panel, and inclinable with respect to a vertical center axis of the first switch member, in association with the motion of the knob member.

4. The system switch device as set forth in claim 1, further comprising at least one second switch member arranged on the flat panel at a position where a user's finger is placed when the user's hand is placed on the knob member.

5. The system switch device as set forth in claim 1, further comprising a resilient member for urging the first switch member toward a neutral position thereof.

* * * * *